United States Patent [19]
Maruyama et al.

[11] Patent Number: 6,067,536
[45] Date of Patent: May 23, 2000

[54] NEURAL NETWORK FOR VOICE AND PATTERN RECOGNITION

[75] Inventors: Masakatsu Maruyama; Hiroyuki Nakahira; Masaru Fukuda; Shiro Sakiyama, all of Osaka, Japan

[73] Assignee: Matsushita Electric Industrial Co., Ltd., Osaka, Japan

[21] Appl. No.: 08/864,938

[22] Filed: May 29, 1997

[30] Foreign Application Priority Data

May 30, 1996 [JP] Japan .................................. 8-136822

[51] Int. Cl.[7] ...................................................... G06E 1/00
[52] U.S. Cl. ............................... 706/25; 706/15; 706/25; 706/27
[58] Field of Search ................................ 706/15, 25, 27, 706/41, 42

[56] References Cited

U.S. PATENT DOCUMENTS

| | | | |
|---|---|---|---|
| 4,479,241 | 10/1984 | Buckley | 382/159 |
| 4,774,677 | 9/1988 | Buckley | 706/23 |
| 4,989,256 | 1/1991 | Buckley | 706/41 |
| 5,161,203 | 11/1992 | Buckley | 382/157 |
| 5,204,938 | 4/1993 | Skapura et al. | 706/42 |
| 5,325,464 | 6/1994 | Pechanek et al. | 706/41 |
| 5,375,250 | 12/1994 | Van Den Heuvel | 706/41 |
| 5,487,153 | 1/1996 | Hammerstrom et al. | 395/670 |
| 5,517,600 | 5/1996 | Shimokawa | 706/15 |
| 5,524,175 | 6/1996 | Sato et al. | 706/41 |
| 5,608,844 | 3/1997 | Gobert | 706/42 |
| 5,649,069 | 7/1997 | Gobert | 706/41 |
| 5,748,849 | 5/1998 | Gobert | 706/27 |

FOREIGN PATENT DOCUMENTS 5-61847  3/1993  Japan .

OTHER PUBLICATIONS

Korn, Granino A., "Neural Networks and Fuzzy–Logic Control on Personal Computers and Workstations", The MIT Press, Cambridge, Massachusetts, pp. 70, Jan. 1995.

Hrycej, Tomas, "Modular Learning in Neural Networks: A Modular Approach to Neural Network Classification", John Wiley and Sons, Inc., pp. 36, Jan. 1992.

*Primary Examiner*—Tariq R. Hafiz
*Assistant Examiner*—Wilbert L. Starks, Jr.
*Attorney, Agent, or Firm*—McDermott, Will & Emery

[57] ABSTRACT

A neural network circuit for performing a processing of recognizing voices, images and the like comprises a weight memory for holding a lot of weight values (initial weight values) which correspond to a plurality of input terminals of each of a plurality of neurons forming a neural network and have been initially learned, and a difference value memory for storing difference values between the weight values of the weight memory and additionally learned weight values. The weight memory is formed by a ROM. The difference value memory is formed by a SRAM, for example. During operation of recognizing input data, the initial weight values of the weight memory and the difference values of the difference value memory are added together. The added weight values are used to calculate an output value of each neuron of an output layer. Accordingly, the initial weight values can be additionally learned at a high speed by existence of the difference value memory having a small capacity. Thus, new numerals, characters and the like can be recognized well without error.

15 Claims, 18 Drawing Sheets

Fig. 16

| type \ number | 0 | 1 | 2 | 3 | 4 | 5 | 6 | 7 | 8 | 9 |
|---|---|---|---|---|---|---|---|---|---|---|
| 0 | 0 | 1 | 2 | 3 | 4 | 5 | 6 | 7 | 8 | 9 |
| 1 | 0 | 1 | 2 | 3 | 4 | 5 | 6 | 7 | 8 | 9 |
| 2 | 0 | 1 | 2 | 3 | 4 | 5 | 6 | 7 | 8 | 9 |

——— (SOLID LINE) WEIGHT VALUES IN INITIAL LEARNING

- - - - (BROKEN LINE) WEIGHT VALUES AFTER ADDITIONAL LEARNING

NEURAL NETWORK FOR VOICE AND PATTERN RECOGNITION

BACKGROUND OF THE INVENTION

The present invention relates to an improvement of a neural network circuit for performing a processing of recognizing voice patterns, image patterns and the like.

In recent years, a great interest has been taken to the field of neural networks for information processings. These neural networks are implemented by an electronic circuit by imitating structures of neurons of organism.

Conventionally, various neural network circuits have been proposed. FIG. 15 shows a neural network having a layer structure. The neural network shown in FIG. 15 comprises an input layer and an output layer. The output layer includes a plurality of neurons (four neurons in FIG. 15). A set of image or voice data are input to the input layer, and their results of recognition are output from the output layer. Conventionally, there has been a method for hierarchically superposing neural networks having such a layer structure to form a multi-layer neural network.

In the neural network shown in FIG. 15, the neuron forming the output layer comprises a neuron 1 shown in FIG. 14. The neuron 1 shown in FIG. 14 has an output terminal Y and a plurality of input terminals Xi. Each input terminal Xi is multiplied by a weight coefficient Wi corresponding thereto. Results of the multiplication are added. Results of the addition thus obtained are output. A plurality of numerals and characters are preliminarily caused to correspond to the neurons of the output layer such that an output value (addition result value) of the neuron corresponding to a set of data forming any numeral or character is set to a maximum value in the output layer when the data is input to the input layer. This is performed by optimizing a plurality of weight coefficients Wi of each neuron 1. Accordingly, when inputting a set of particular data, an output value of the neuron corresponding thereto is a result of recognition for the particular data. A process for changing and optimizing the weight coefficients Wi is referred to as neural network learning, and a calculating rule of a change quantity of the weight coefficient Wi is referred to as a learning rule.

Most of the neural network processings are realized by a von Neumann type computer.

FIG. 13 shows an example. A network circuit according to the prior art shown in FIG. 13 comprises an input memory 101, a weight memory 102, a multiplier 103, a selecting circuit 104, an adder 105, a register 106, an output memory 107 and a control circuit 108.

The input memory 101 holds many sets of input data to be given to a neural network. The weight memory 102 stores a weight coefficient (hereinafter referred to as a weight value) corresponding to each set of input data. The output memory 107 holds results of calculation as the neural network.

A detailed structure of the conventional circuit shown in FIG. 13 will be described below by using operation. In the conventional circuit, a start signal is sent to the control circuit 108 so that a processing is performed in response to a clock signal. An address A is given from the control circuit 108 to the input memory 101 so that one input data is read from the input memory 101. An address B is given from the control circuit 108 to the weight memory 102 so that a weight value is read from the weight memory 102. The read weight value corresponds to the input data read from the input memory 101.

The multiplier 103 multiplies the input data read from the input memory 101 and the weight value read from the weight memory 102. A result of the multiplication is output to the adder 105.

The selecting circuit 104 selects a value "0" in response to a switching signal A sent from the control circuit 108 only when performing first calculation in each neuron. Accordingly, the adder 105 adds the value "0" and the result of the multiplication performed by the multiplier 103. A result of the addition performed by the adder 105 is held by the register 106. Then, the selecting circuit 104 selects a value of the register 106. The adder 105 adds the value of the register 106 and the result of the multiplication performed by the multiplier 103. A result of the addition is held by the register 106.

At the end of the calculation performed in a first neuron, an address "0" is output from the control circuit 108. At this time, a result of cumulative addition of the data held by the register 106, that is, input data on the first neuron of the output layer of the neural network shown in FIG. 15 is written to the address "0" of the output memory 107. Then, the same addition processing is performed for second and subsequent neurons. Results of the addition are sequentially written to an address "1" and subsequent addresses of the output memory 107.

If image or voice data are given as the input data of the conventional network circuit shown in FIG. 13, images or voices can be recognized by execution of the processing.

Learning of the weight value will be described below. The learning of the weight value includes initial learning for changing the weight value in the initial state and additional learning for additionally changing the weight value which has been initially learned. The initial learning serves to recognize ten numerals 0 to 9 of types "0" and "1" shown in FIG. 16, for example. More specifically, if the number of the neurons of the output layer is 10, the numerals are caused to correspond to the neurons one by one. Each weight value is changed in such a manner that an output of a neuron corresponding to a particular numeral is a maximum value in all the neurons of the output layer when inputting the same numeral. The additional learning performs a processing of changing each weight value in such a manner that each numeral of a type "2" shown in FIG. 16 is additionally recognized individually or locally, for example.

The initial learning and the additional learning perform the same processing of changing the weight value. The processing of changing the weight value in the initial learning will be described below. The case where the numerals 0 to 9 of the types "0" and "1" shown in FIG. 16 are recognized will be described below by using a Hebb learning rule as the learning rule. The Hebb learning rule performs a processing of selecting particular one or more neurons to be learned and changing a plurality of weight values of the neurons. By this processing, a weight value corresponding to each input terminal of the neuron is increased in proportion to a data size Xi sent to the input terminal. A weight value W is obtained by the following equation:

$$W(t+1) = a * Xi + W(t)$$

wherein "t" represents a time (number of times) and "a" represents a coefficient having a predetermined value of the learning. Each numeral comprises a set of data having a lot of pixels as shown by the numeral "0" in FIG. 18, for example. The pixels have multi-values.

In a learning flow shown in FIG. 17, variables "flag", "type" and "number" to be used for the learning are initialized into "0" at Step S0. Then, a value of each pixel of a first numeral 0 (number=0) of the type "0" shown in FIG. 16 is input to the input layer at Step S1, and an output value of each neuron of the output layer is obtained at Step S2. At Step S3, it is decided whether or not a neuron having a maximum output value corresponds to the numeral "0" (that is, a first neuron). If not so, a weight value of the first neuron is learned at Step S4 where a plurality of weight values W are calculated and changed by the above-mentioned equation and "flag=1" is set to display "learning".

Then, it is decided whether or not the numerals 0 to 9 have completely been recognized at Step S5. If not so, the number of an intended numeral is increased by "1" at Step S6 and the above-mentioned processing is continued.

If all the numerals of the type "0" are completely recognized, it is decided whether the type is "1" or not at Step S7. At first, the type is "0". At Step S8, the type is set to "1" and the number of the input numeral is set to "0" again. Steps S1 to S6 are repeated to recognize all the numerals 0 to 9 with type=1.

If all the numerals of the type "1" are completely recognized, a value of the flag is decided at Step S9. If the flag is "1", learning is performed. Therefore, in order to confirm that the numerals corresponding to the neurons other than the neuron having the weight value changed are always recognized precisely, all the variables "flag", "type" and "number" are set to "0" again at Step S10 and the above-mentioned processing is repeated. After performing such a processing, it is apparent that all the numerals of all the types have precisely been recognized if the flag is 0 at Step S9. Consequently, the processing is ended.

In the conventional neural network circuit, however, a large quantity of image data and the like are input. In order to recognize the data, accordingly, the weight memory should store a great number of weight values and becomes large-sized. For this reason, it has been proposed that the weight memory is formed by a ROM which is physically smaller than a RAM to reduce a size thereof. However, since the weight value cannot be changed by the ROM, it cannot be additionally learned.

If the weight memory is formed by the RAM such that the weight value can be additionally learned, it becomes large-sized.

Consequently, the weight memory should be provided outside. As a result, it takes a lot of time to additionally learn the weight value.

SUMMARY OF THE INVENTION

It is an object of the present invention to provide a neural network circuit capable of additionally learning a plurality of weight values at a high speed even if a conventional weight memory is formed by a ROM.

In order to achieve the above-mentioned object, the neural network circuit according to the present invention employs a structure having a special memory for changing the weight values to be additionally learned besides the conventional weight memory.

The neural network circuit according to the present invention comprises a plurality of neurons composing at least one layer and each having an output terminal and a plurality of input terminals, in which a set of input data are given to each of the input terminals of the neurons to obtain respective outputs of the neurons and are recognized on the basis of the respective outputs, comprising a weight memory for storing a plurality of initially learned weight values which respectively correspond to the input terminals of the neurons, a difference value memory for storing difference values between the respective initially learned weight values stored in the weight memory and respective additionally learned weight values which respectively correspond to the initially learned weight values stored in the weight memory, and calculating means for calculating respective output values of the neurons on the basis of the set of input data given, the initially learned weight values of the weight memory and the difference values of the difference value memory when recognizing the set of input data.

In addition, the present invention provides the neural network circuit further comprising weight value changing means for changing the weight values stored in the weight memory according to a predetermined learning rule so as to precisely recognize a new set of input data at the additional learning.

Furthermore, the present invention provides a neural network circuit comprising a plurality of neurons composing at least one layer and each having an output terminal and a plurality of input terminals, in which a set of input data are given to each of the input terminals of the neurons to obtain respective outputs of the neurons on the basis of the set of input data and weight values respectively corresponding to the input terminals of the respective neurons and are recognized on the basis of the respective outputs, comprising a weight memory for storing a plurality of initially learned weight values which respectively correspond to the input terminals of the neurons, weight value changing means for changing the initially learned weight values stored in the weight memory according to a predetermined learning rule so as to precisely recognize a new set of input data at additional learning of the additionally learned weight values, and a difference value memory for storing difference values between the respective initially learned weight values stored in the weight memory and respective additionally learned weight values which respectively correspond to the initially learned weight values stored in the weight memory by the weight value changing means.

With the above-mentioned structure, the difference values between the weight values stored in the weight memory and the additionally learned weight values are stored in the difference value memory. During subsequent image recognition and the like, the weight values stored in the weight memory and the difference values stored in the difference value memory are respectively added to obtain the additionally learned weight values. The newest weight values are used to perform a processing.

In the case where a part of the weight values are additionally learned, a size of the difference value memory can be reduced correspondingly. Also in the case where all the weight values are additionally learned, the difference values are smaller than the weight values stored in the weight memory. Accordingly, the difference value memory may be a memory having a smaller bit width than that of the weight memory. As a result, the difference value memory can be built in. Thus, the additional learning can be performed at a high speed.

BRIEF DESCRIPTION OF THE DRAWINGS

The accompanying drawings illustrate preferred embodiments of the present invention, in which:

FIG. 7($b$) is a chart limiting a difference value dWij (n) between the initial weight value Wij (o) and the weight value obtained after additional learning by using the limiter according to the second embodiment of the present invention;

FIG. 7($c$) is a chart showing the weight value used during operation of recognizing a set of input data;

FIG. 16 is a diagram showing an example of numerals recognized by initial learning and additional learning;

FIG. 19($b$) is a chart showing the state obtained before and after the additional learning of n weight values in each neuron.

DETAILED DESCRIPTION OF THE INVENTION

Each preferred embodiment of the present invention will be described below with reference to the accompanying drawings.

First Embodiment

Figure 1:
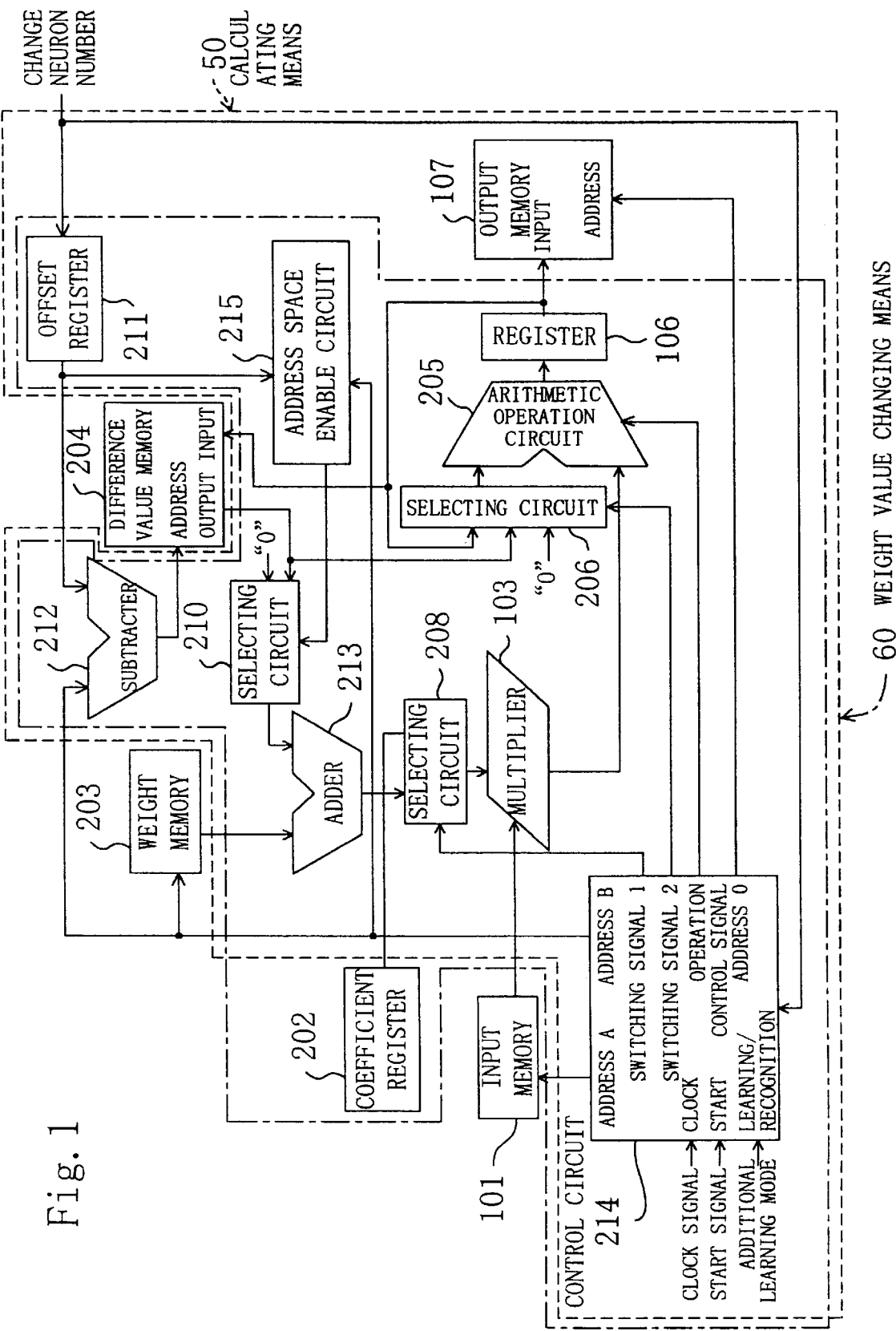
FIG. 1 is a diagram showing a neural network circuit according to a first embodiment of the present invention.

FIG. 1 shows a neural network circuit according to a first embodiment of the present invention.

Figure 15:
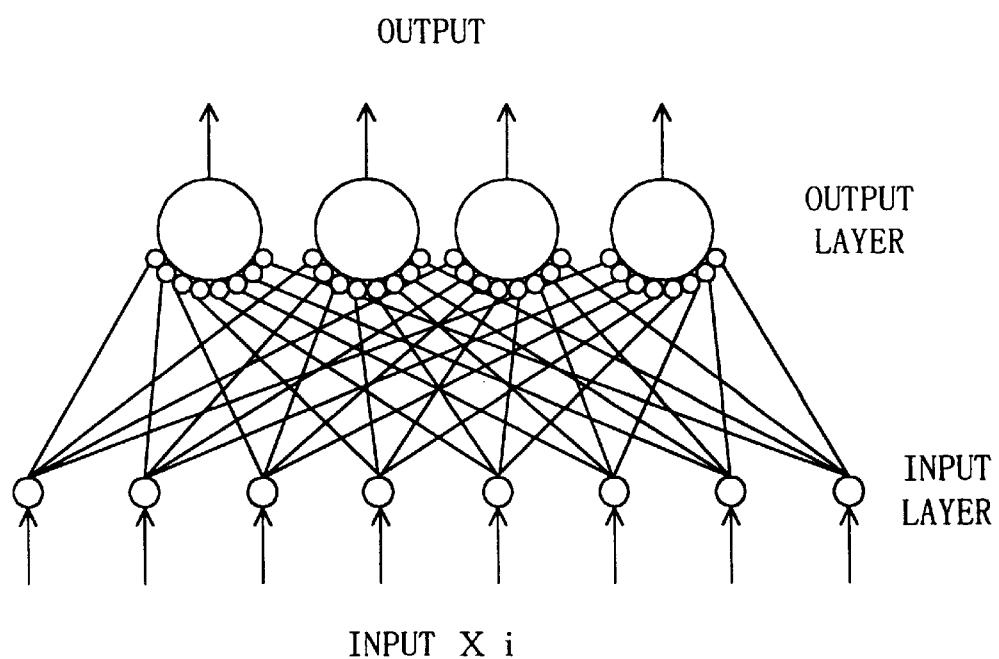
FIG. 15 is a diagram showing a structure of a neural network.
Figure 17:
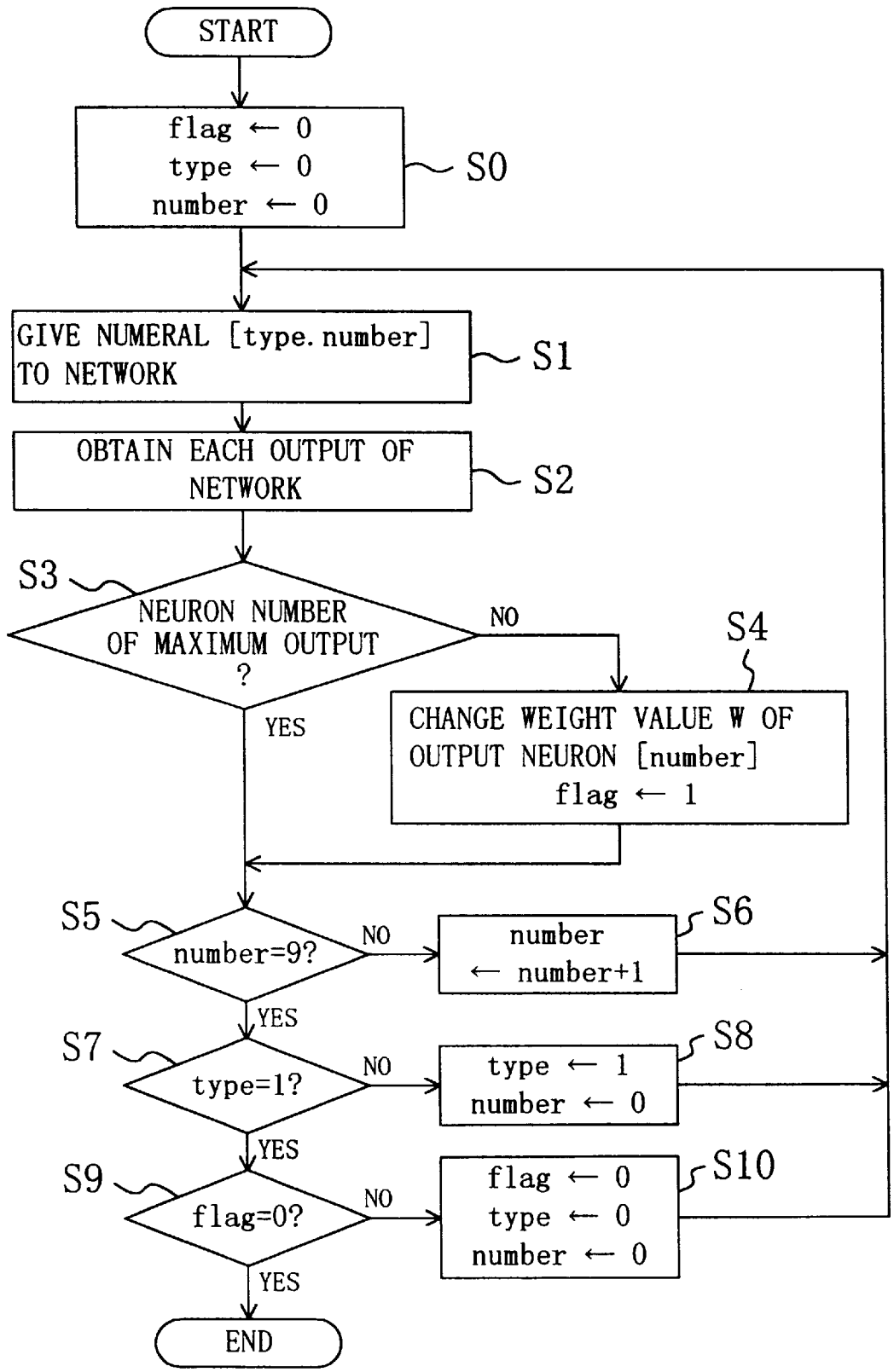
FIG. 17 is a flowchart for explaining a flow of an additional learning processing of a weight value using a Hebb learning rule.
Figure 18:
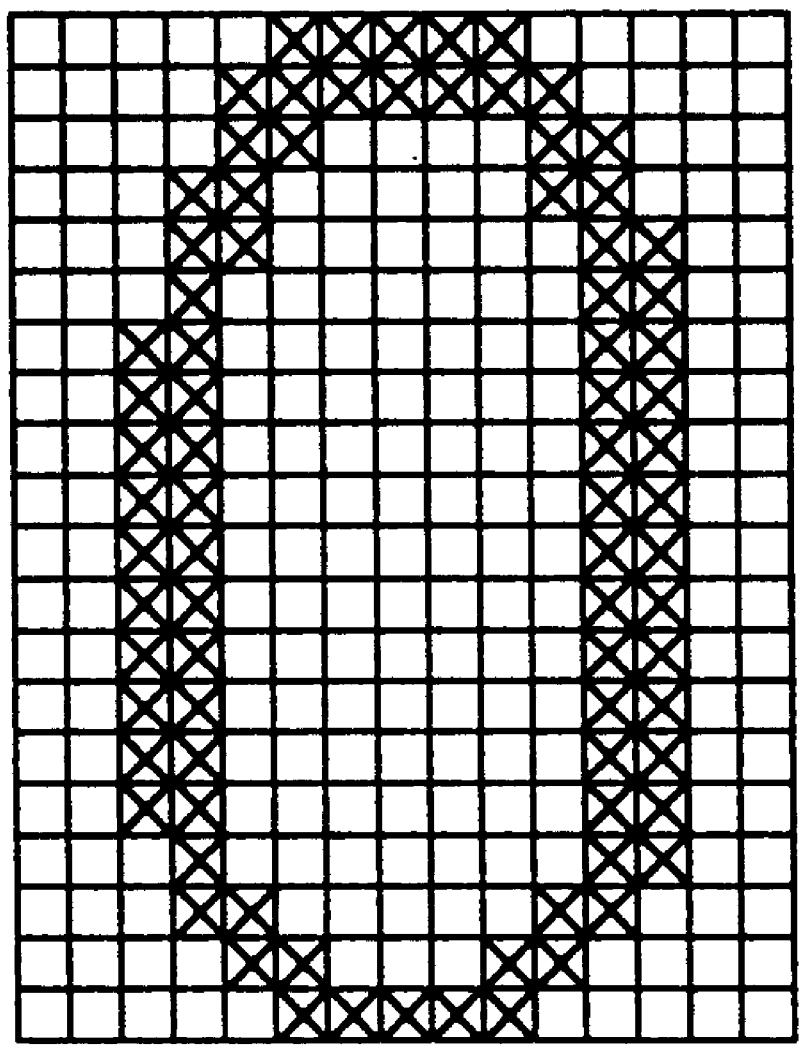
FIG. 18 is a diagram showing a structure of pixels of the recognized numerals.

The neural network circuit shown in FIG. 1 performs a processing of a neural network having a layer structure shown in FIG. 15.

The neural network circuit shown in FIG. 1 comprises an input memory 101, a coefficient register 202, a weight memory 203 formed by a ROM, a difference value memory 204 formed by a SRAM, a subtracter 212, an adder 213, an offset register 211, a multiplier 103, an arithmetic operation circuit 205, a register 106, an output memory 107, selecting circuits 210, 208 and 206, a control circuit 214, and an address space enable circuit 215.

The input memory 101 holds many sets of input data to be given to the neural network. The weight memory 203 stores weight values corresponding to the input data. Each weight value has been initially learned. The difference value memory 204 preliminarily retains a value "0" in all regions, and stores a difference value between the weight value of the weight memory 203 and that obtained after additional learning. The output memory 107 serves to hold a result of calculation as a neural network.

Figure 2:
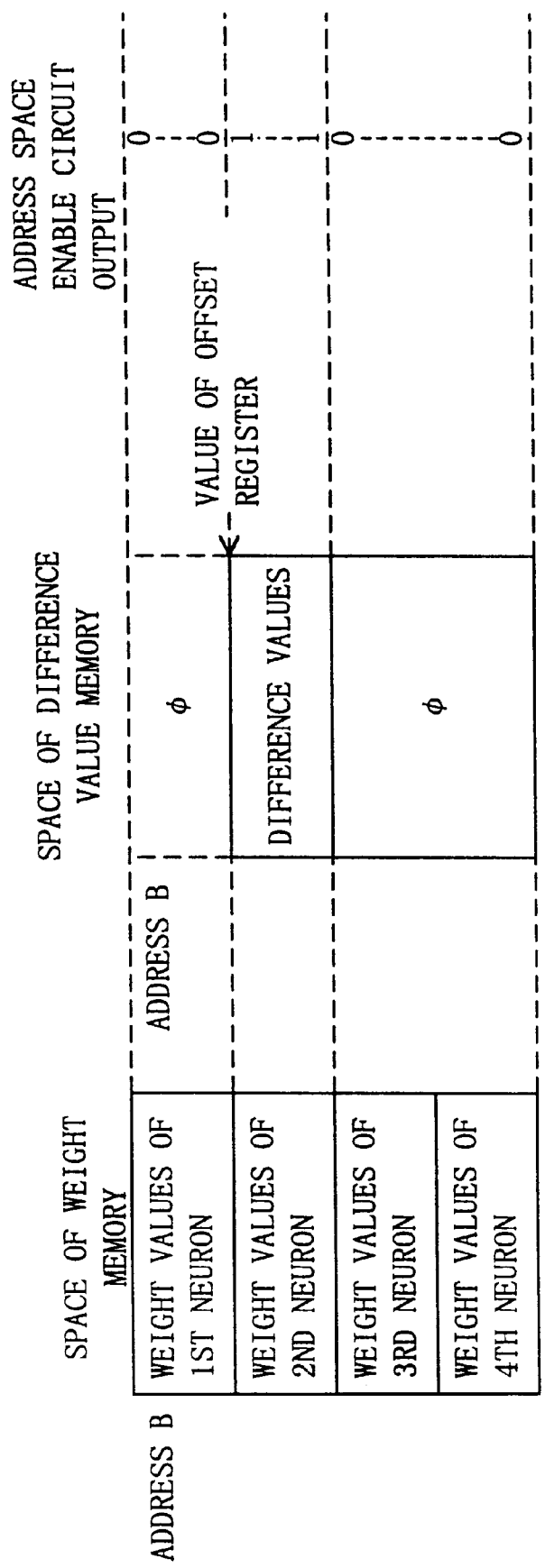
FIG. 2 is a diagram showing both address maps of a weight memory and a difference value memory according to the first embodiment of the present invention.

FIG. 2 shows a relationship among the weight memory 203, the difference value memory 204, the offset register 211 and the address space enable circuit 215. In FIG. 2, the weight memory 203 stores weight values whose number is equal to the number of input terminals for all (four) neurons forming the neural network shown in FIG. 15. The difference value memory 204 has only a space for storing difference values for a plurality of weight values of a particular neuron (a second neuron shown in FIG. 15) to be additionally learned. The offset register 211 serves to offset an address B for specifying a weight value of the weight memory 203 and to generate a first address of the difference value memory 204. The address space enable circuit 215 serves to output a signal having a value "1" from the first address of the difference value memory 204 to a last address thereof, whose structure will be described below.

A detailed structure of the neural network circuit shown in FIG. 1 will be described below on the basis of operation.

If an operation mode of the control circuit 214 is set to a recognizing mode of a set of input data, a start signal is sent to the control circuit 214 so that a processing is performed in response to a clock signal. An address A is sent from the control circuit 214 to the input memory 101 so that one input data is read from the input memory 101. An address B is sent from the control circuit 214 to the weight memory 203 so that a weight value is read from the weight memory 203. The weight value corresponds to the read input data.

The address B sent from the control circuit 214 is given to the subtracter 212. The subtracter 212 subtracts a value of the offset register 211 from the address B. A result of the subtraction is given to the difference value memory 204. A difference value is read from the difference value memory 204 by using the given result of the subtraction as an address.

The selecting circuit 210 is controlled by an output of the address space enable circuit 215, and selects an output of the difference value memory 204 when the output of the address space enable circuit 215 is a signal having a value "1" and selects a value "0" when the same output is a signal having the value "0".

The adder 213 adds the weight value sent from the weight memory 203 and the output of the selecting circuit 210. Accordingly, if the weight value of the weight memory 203 is additionally learned, the weight value sent from the weight memory 203 and the difference value sent from the difference value memory 204 are added and output. The weight value of the weight memory 203 is output from the adder 213 if it does not need to be additionally learned.

The selecting circuit 208 selects the output of the adder 213 in the recognizing mode in response to a switching signal 1 sent from the control circuit 214. Accordingly, the output of the adder 213 is input to the multiplier 103.

The multiplier 103 receives input data sent from the input memory 101 and multiplies the input data and the weight value sent from the adder 213. At this time, the input data corresponds to the weight value. A result of the multiplication performed by the multiplier 103 is output to the arithmetic operation circuit 205.

The selecting circuit 206 selects a value "0" during first calculation in each neuron and subsequently selects a value of the register 106 in the recognizing mode in response to a switching signal 2 sent from the control circuit 214, and outputs them.

The control circuit 214 outputs an operation control signal for specifying addition. The control signal is input to the arithmetic operation circuit 205. The arithmetic operation circuit 205 adds the value "0", and the result of the multiplication performed by the multiplier 103 during the first calculation in each neuron, and then adds the output of the register 106 and the result of the multiplication performed by the multiplier 103. Results of the addition thus obtained are output to the register 106. Accordingly, the register 106 holds a result of cumulative addition of the input data and the weight value for each neuron of the neural network.

At the end of the calculation in each neuron, the control circuit 214 outputs a signal having an address "0" and the output of the register 106 is written to an area having the address "0" of the output memory 107.

The additional learning of the neural network circuit shown in FIG. 1 will be described below. An additional learning method will be described as a Hebb rule. The Hebb rule has been disclosed in hebb, D. o., The Organization of Behavior, Wiley, New York 1949.

In the Hebb rule, a weight value is changed for a specified neuron according to the following equations 1 and 2:

$$Winew = Wiold + \Delta Wi \quad (1)$$

$$\Delta Wi = Xi \times \alpha \quad (2)$$

wherein Xi represents a value of data input to an ith input terminal, Winew represents a weight value corresponding to the ith input terminal after update, Wiold is a weight value corresponding to the ith input terminal before the update, and α represents a change constant. If the number of changes of the weight value is represented by n, a weight value Wi(n) obtained after performing update n times is calculated by the following equation (3):

$$Wi(n) = Wi(0) + Xi(1) \times \alpha + Xi(2) \times \alpha + \ldots + Xi(n) \times \alpha \quad (3)$$

wherein each numeral in parentheses represents the number of times. Assuming that the weight value Wi(n) is obtained by addition of an initial weight value and a difference value, the following equations are obtained:

$$Wi(n) = Wi(0) + dWi(n) \quad (4)$$

$$dWi(1) = Xi(1) \times \alpha \quad (5)$$

$$dWi(2) = dWi(1) + Xi(2) \times \alpha \quad (6)$$

$$dWi(3) = dWi(2) + Xi(3) \times \alpha \quad (7)$$

Consequently, it is apparent that a value X of current input data is multiplied by α and a value thus obtained is added to a changed value so that a difference from the initial weight value is obtained.

The operation of the additional learning of the neural network circuit according to the present embodiment will be described below.

A neuron number (change neuron number) for changing a weight value is preliminarily set to the offset register 211 and the control circuit 214, and a mode of the control circuit 214 is preliminarily set to an additional learning mode.

An additional learning processing is performed in response to a clock signal by sending a start signal to the control circuit 214. The control circuit 214 sequentially outputs input data specified by the change neuron number and addresses A and B of the weight value.

By the address A sent from the control circuit 214, input data is read from the input memory 101 and is given to the multiplier 103. A change coefficient α of the coefficient register 202 is sent to the multiplier 103 through the selecting circuit 208.

The multiplier 103 multiplies the input data sent from the input memory 101 and the change coefficient α sent from the coefficient register 202, and outputs a result of the multiplication to the arithmetic operation circuit 205.

The address B sent from the control circuit 214 is also given to the subtracter 212. The subtracter 212 subtracts a value of the offset register 211 from the address B. A result of the subtraction is sent to the difference value memory 204. The difference value memory 204 outputs a difference value corresponding to the input data sent from the input memory 101. The difference value is sent to the arithmetic operation circuit 205 through the selecting circuit 206.

The arithmetic operation circuit 205 acts as an adder in response to an operation control signal sent from the control circuit 214 so as to add the result of the multiplication performed by the multiplier 103 and the difference value sent from the difference value memory 204. A result of the addition is held by the register 106. A value of the register 106 corresponds to the values obtained by the equations (5) to (7). The value of the register 106 is retained as a difference value between the initial weight value and a weight value obtained after the additional learning by the difference value memory 204.

In FIG. 1, all components but the input memory 101, the weight memory 203, the difference value memory 204 and the coefficient register 202 form calculating means 50 for calculating an output value of each neuron of the output layer on the basis of a set of input data sent from the input memory 101, the initial weight value held by the weight memory 203 and the difference value dWi(n) stored in the difference value memory 204 when recognizing the input data.

In FIG. 1, all components but the input memory 101, the weight memory 203, the difference value memory 204 and the output memory 107 form weight value changing means 60 for changing a part of initial weight values stored in the weight memory 203 according to the Hebb rule so as to precisely recognize each set of input data corresponding to each numeral of a type "2" shown in FIG. 16 during additional learning for additionally recognizing the numeral.

Figure 19A:
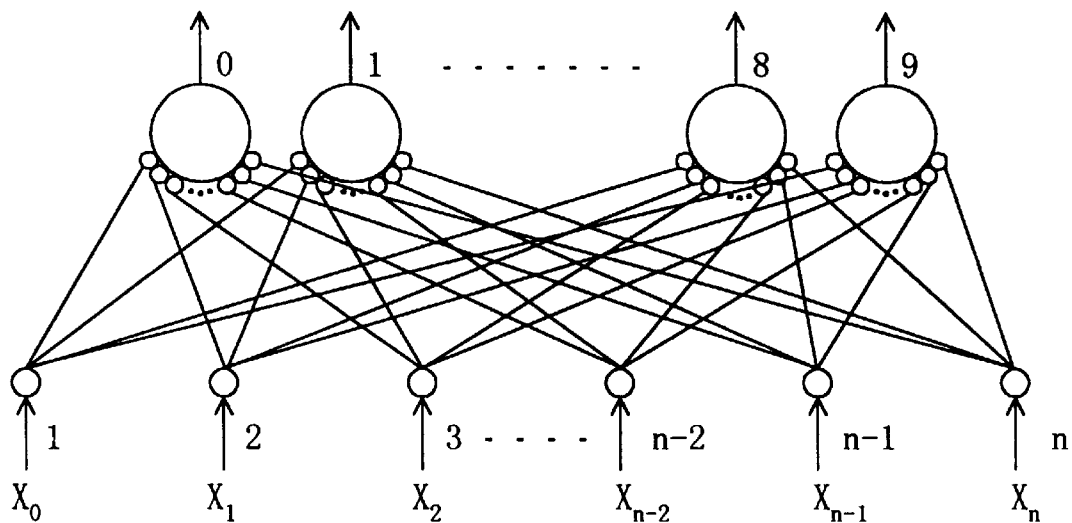
FIG. 19($a$) is a diagram showing a structure of a neural network in which an output layer is formed by 10 neurons.
Figure 19B:
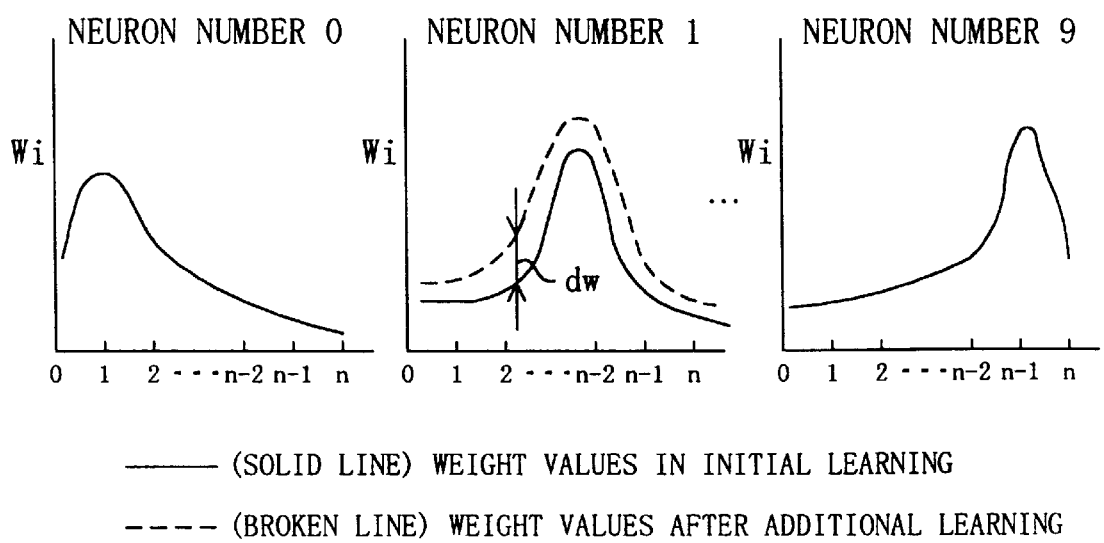

In the Hebb learning rule, when the output layer includes 10 neurons (having numbers 0 to 9) as shown in FIG. 19(a) and the weight value is additionally learned for only a neuron having the number "1", n weight values of the neuron having the number "1" which are obtained during initial learning shown by a solid line are increased by a small value dW as shown by a broken line in FIG. 19(b) and weight values of other neurons are not changed as shown in FIG. 19(b).

Figure 3:
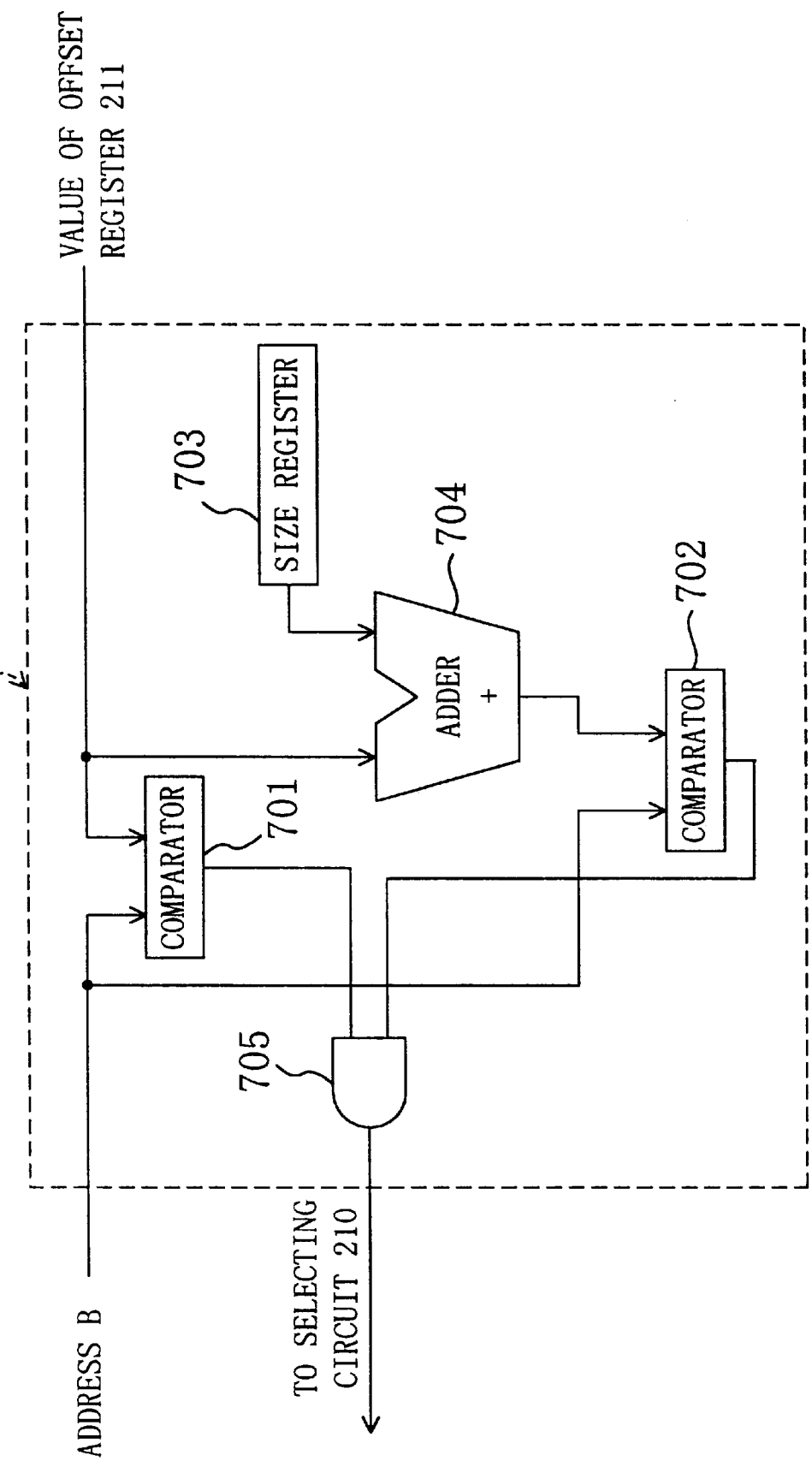
FIG. 3 is a diagram showing a structure of an address space enable circuit according to the first embodiment of the present invention.

A structure of the address space enable circuit 215 will be described below with reference to FIG. 3. The enable circuit 215 shown in FIG. 3 includes two comparators 701 and 702, a size register 703, an adder 704 and an AND circuit 705. The comparator 701 compares a value A of the offset register 211 shown in FIG. 1 with a value of the address B sent from the control circuit 214, and outputs a value "1" if B is equal to or greater than A. The size register 703 stores the number of addresses of the difference value memory 204 (the number of difference values to be stored). The adder 704 adds a value of the size register 703 and the value A of the offset register 211, and outputs a result of the addition, that is, a last address of the difference value memory 204. The comparator 702 compares an output C of the adder 704 with a value of the address B sent from the control circuit 214, and outputs a value "1" if B is smaller than C. The AND circuit 705 ANDs the outputs of the comparators 701 and 702. Accordingly, an output of the AND circuit 705 outputs a signal having the value "1" in an address range of the difference value memory 204 as shown in FIG. 2. This signal is output to the selecting circuit 210 shown in FIG. 1.

According to the neural network circuit of the present embodiment, the weight memory 203 is a ROM having such a size as to hold a plurality of weight values of all the neurons, and the difference value memory 204 is a SRAM having a small size to hold weight values of one or more (a small number of) neurons. Therefore, a desired neuron (to be additionally learned) can be additionally learned, and the difference value memory 204 having a small size can be built in so that the weight value can be additionally learned at a high speed. Thus, the additional learning can be performed quickly.

Second Embodiment

Figure 4:
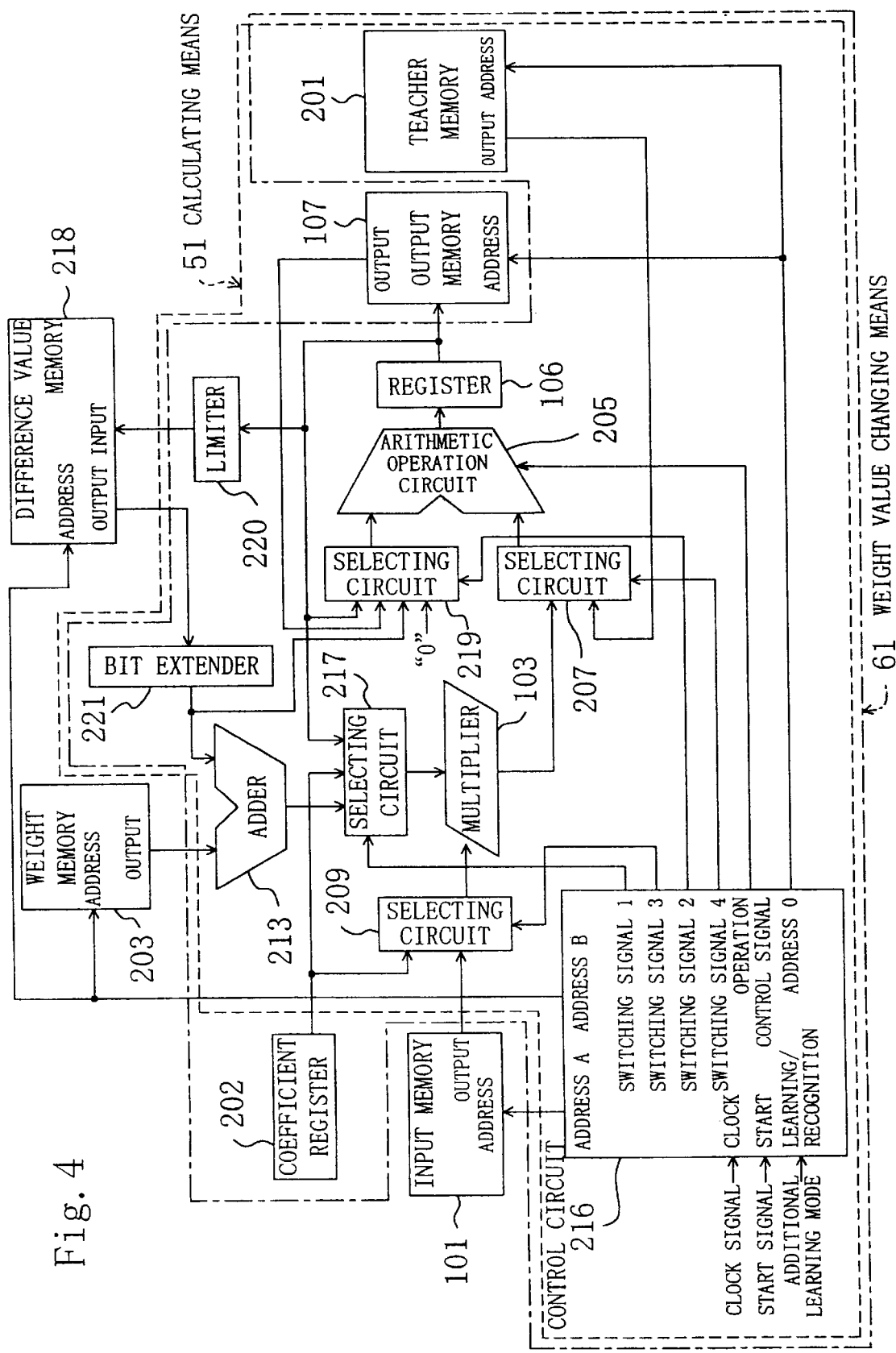
FIG. 4 is a diagram showing a neural network circuit according to a second embodiment of the present invention.

FIG. 4 shows a neural network circuit according to a second embodiment of the present invention.

In the present embodiment, additional learning can be performed by using a Delta rule or a back propagation rule as a learning rule. The case where the Delta rule is used as the learning rule will be described below. As the Delta rule, Pilip D. Wasserman, Neural Computing: Theory and Practice, Van Nostrand Reinhold, 1989 has been disclosed.

A weight value is changed for all neurons in accordance with the following equations (8) and (9):

$$Wij\text{new} = Wij\text{old} + \Delta Wij \quad (8)$$

$$\Delta Wij = (Tj - Oj)Xij \times \alpha \quad (9)$$

wherein Oj represents an output value of a jth neuron, Tj represents a teacher value of the jth neuron, Xij represents a value of data input to an ith input terminal of the jth neuron, Wijnew represents a weight value corresponding to an ith input terminal of the jth neuron obtained after update, Wijold represents a weight value corresponding to the ith input terminal of the jth neuron obtained before the update, and α represents a change constant. If the number of changes of the weight value is n, a weight value Wij (n) obtained after performing update n times is obtained by the following equation (10):

$$Wij(n) = Wij(0) + \Delta Wij(1) + \Delta Wij(2) + \ldots + \Delta Wij(n) \quad (10)$$

wherein each numeral in parentheses represents the number of times. Assuming that the weight value Wij (n) is obtained by addition of an initial weight value Wij (0) and a difference value, the following equations are obtained.

$$Wij(n) = Wij(0) + dWij(n) \quad (11)$$

$$dWij(1) = (Tj(1) - Oj(1)) \times Xij(1) \times \alpha \quad (12)$$

$$dWij(2) = dWij(1) + (Tj(2) - Oj(2)) \times Xij(2) \times \alpha \quad (13)$$

$$dWij(3) = dWij(2) + (Tj(3) - Oj(3)) \times Xij(3) \times \alpha \quad (14)$$

Consequently, it is apparent that a value X of current input data and an output error of a neuron (a teacher value–an output value) are multiplied together, a result of the multiplication is multiplied by α and a result thus obtained is added to a changed value so that a difference value from the initial weight value is obtained. dWij represents a difference value from the initial weight value Wij (0) and is positive or negative.

Figure 7A:
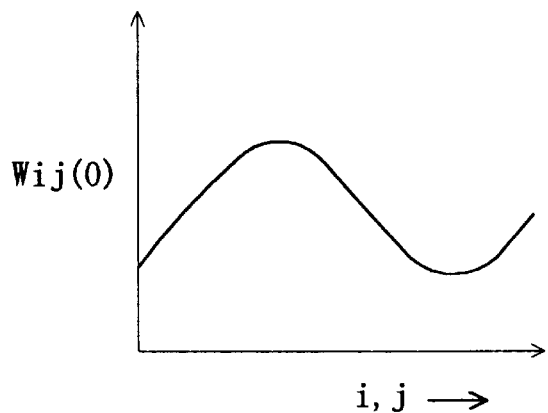
FIG. 7($a$) is a chart showing a plurality of weight values (initial weight values) Wij (0) stored in the weight memory.
Figure 7B:
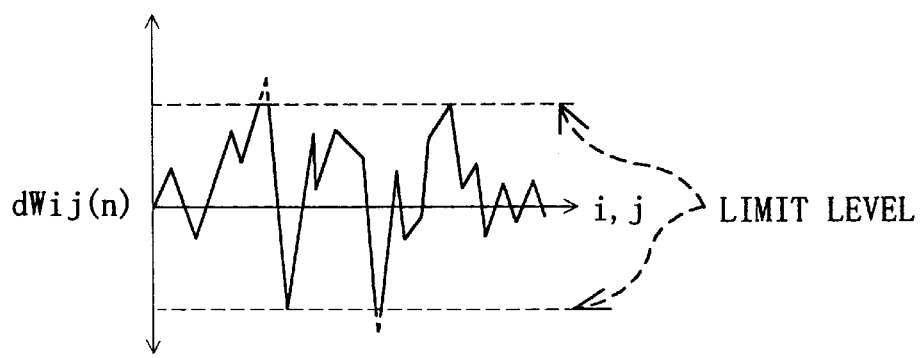

The points of the present embodiment are as follows. In the case where a lot of weight values (initial weight values) Wij (0) stored in the weight memory are identical to values shown in FIG. 7(a) and the difference values dWij (n) between the initial weight values and the weight values obtained after additional learning are identical to values shown in FIG. 7(b), a maximum difference value dWij (n) is limited with a limit level having a predetermined value (see FIG. 7(b)) and the difference value dWij (n) obtained after the limitation is stored in the difference value memory.

Figure 7C:
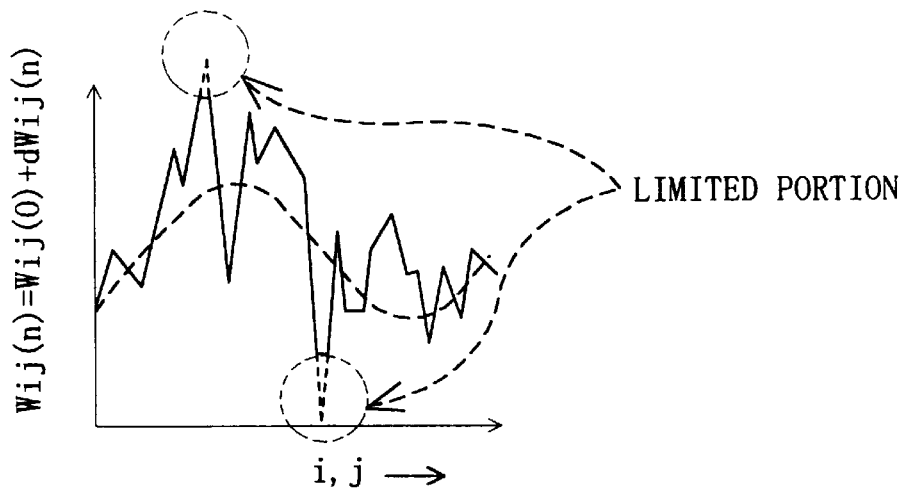

Consequently, the size of the difference value memory can be reduced still more. In operation of recognizing images and the like, the weight value Wij (n) to be used is a value (Wij (n)=Wij (0)+dWij (n)) obtained by adding the initial weight value Wij (0) and the difference value dWij (n) as shown in FIG. 7(c). A weight value using the difference value limited with the limit level makes an error for a true weight value. However, the recognizing operation is performed by using all the weight values. Consequently, even if only a part of the weight values (difference values) are failed, recognizing performance is not essentially affected unless most of other difference values are limited with the limit level.

The neural network circuit according to the present embodiment shown in FIG. 4 will be described below in detail. The neural network circuit shown in FIG. 4 comprises an input memory 101, a coefficient register 202, a weight memory 203 formed by a ROM, a difference value memory 218 formed by a SRAM, for example, an adder 213, a bit extender 221, a limiter 220, a multiplier 103, an arithmetic operation circuit 205, a register 106, an output memory 107, selecting circuits 209, 217, 207 and 219, a control circuit 216, and a teacher memory 201.

A detailed structure of a neural network circuit according to the present embodiment will be described below on the basis of operation.

In operation of recognizing a set of input data, a start signal is sent to the control circuit 216 so that a processing is performed in response to a clock signal. The control circuit 216 is preliminarily set to a recognizing mode.

By an address A sent from the control circuit 216, input data is read from the input memory 101. An address B is sent from the control circuit 216 to the weight memory 203 and the difference value memory 218. The weight memory 203 outputs a weight value corresponding to the address B. The difference value memory 218 outputs a difference value corresponding to the address B. The difference value is given to the bit extender 221. A bit of the difference value is extended by the bit extender 221 to obtain the same bit width as that of a weight value of the weight memory 203. The difference value having the bit extended is given to the adder 213. The adder 213 adds the weight value sent from the weight memory 203 and the difference value having the bit extended. A value obtained by the addition is a weight value corresponding to the input memory 101.

Figure 5:
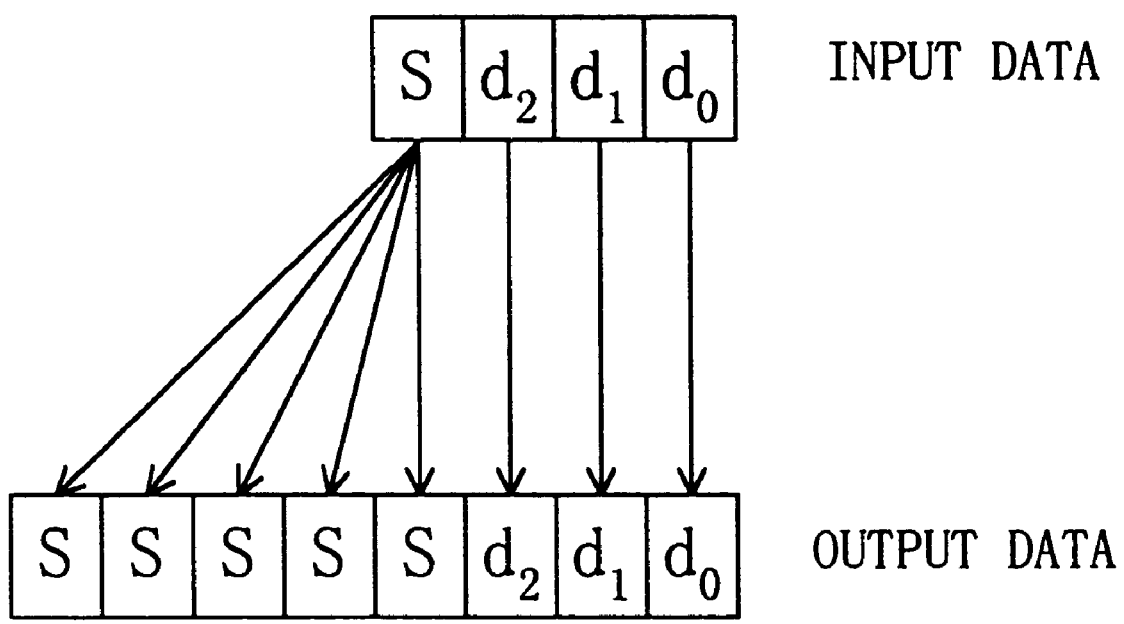
FIG. 5 is a diagram showing operation of a bit extender according to the second embodiment of the present invention.

FIG. 5 shows an input-output data relationship of the bit extender 221. In FIG. 5, when an input difference value has a 4-bit width and an output difference value has an 8-bit width, a sign bit (most significant bit) of the input difference value appears in the range of 4th and 8th low order bits of the output difference value and low order 3 bits of the input difference value are output as they are.

In FIG. 4, the multiplier 103 multiplies input data sent from the input memory 101 which is selected by the selecting circuit 209 and a weight value sent from the adder 213, and outputs a result of the multiplication to the arithmetic operation circuit 205 through the selecting circuit 207.

The selecting circuit 219 selects a value "0" during first calculation in each neuron and subsequently selects a value of the register 106 in a recognizing mode in response to a switching signal 2 sent from the control circuit 216, and outputs them.

The arithmetic operation circuit 205 functions as an adder in response to an operation control signal sent from the control circuit 216, and adds outputs of the selecting circuit 219 and the multiplier 103 and outputs a result of the addition to the register 106. At the end of the calculation in each neuron, the value of the register 106 is written to an area having an address "0" of the output memory 107 in response to an output having the address "0" of the control circuit 216.

By repeating the above-mentioned operation, an output of each neuron 1 of the neural network shown in FIG. 15 is written to the output memory 107.

Operation of additional learning will be described below. In this case, a Delta rule is used as a learning rule. An output of a neural network for the input data of the input memory 101 is preliminarily retained by the output memory 107, and a teacher value of the input data of the input memory 101 is preliminarily retained by the teacher memory 201.

In the operation of additional learning, the difference value dWij shown in the equations (12) to (14) is written to the difference value memory 218. The control circuit 216 is set to an additional learning mode. The operation of additional learning is started in response to a start signal.

Operation of calculating the difference value dWij and writing a result of the calculation to the difference value memory 218 will be described below.

At a first step, (T–O) is calculated in the above-mentioned equations. First of all, a value of the output memory 107 and a value of the teacher memory 201 corresponding thereto are read according to an address "0" of the control circuit 216, and are sent to the arithmetic operation circuit 205 through the selecting circuits 219 and 207, respectively. The selecting circuits 219 and 207 are controlled in response to switching signals 2 and 4 sent from the control circuit 216, respectively. The arithmetic operation circuit 205 executes operation of subtracting the value of the output memory 107 from that of the teacher memory 201 in response to an operation control signal sent from the control circuit 216. A result of the subtraction is held by the register 106.

At a second step, (T–O)·X is calculated in the above-mentioned equation. More specifically, the selecting circuit 217 selects the value of the register 106 in response to a switching signal 1 sent from the control circuit 216, and the selecting circuit 209 selects the value of the input memory 101 in response to a switching signal 3 sent from the control circuit 216. The input memory 101 outputs input data corresponding to the difference value dWij to be calculated according to the address A of the control circuit 216. The multiplier 103 multiplies the input data of the input memory 101 given through the selecting circuit 209 and the value of the register 106 given through the selecting circuit 217, and outputs a result of the multiplication to the selecting circuit 207. The arithmetic operation circuit 205 adds the result of the multiplication of the multiplier 103 sent from the selecting circuit 207 and the value "0" selected by the selecting circuit 219 in response to the operation control signal sent from the control circuit 216. A result of the addition is held by the register 106.

At a third step, $dW(n)+(T-O)\times X\times\alpha$ is executed. More specifically, the selecting circuit 217 selects the value of the register 106 in response to the switching signal 1 sent from the control circuit 216, and the selecting circuit 209 selects the change coefficient $\alpha$ of the coefficient register 202 in response to the switching signal 3 sent from the control circuit 216. The multiplier 103 multiplies the change coefficient $\alpha$ of the coefficient register 202 sent through the selecting circuit 209 and the value of the register 106 sent through the selecting circuit 217, and outputs a result of the multiplication to the selecting circuit 207. The arithmetic operation circuit 205 adds the result of the multiplication performed by the multiplier 103 which is sent from the selecting circuit 207 and the value of the difference value memory 218 selected by the selecting circuit 219 in response to the operation control signal sent from the control circuit 216. A result of the addition is held by the register 106. The value corresponds to the difference value dWij shown in the equations (12) to (14).

Figure 8:
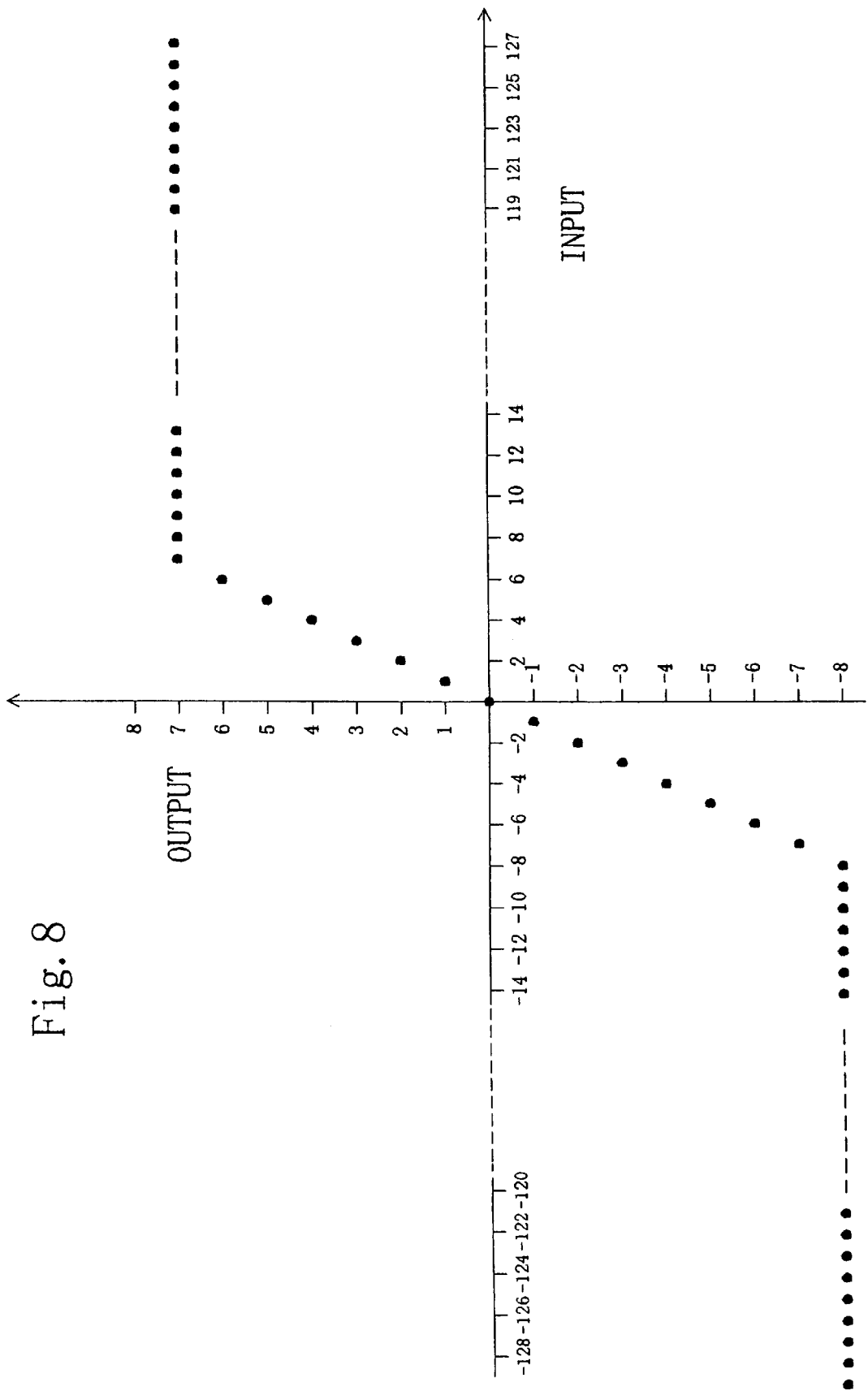
FIG. 8 is a chart for explaining an input-output relationship of the limiter according to the second embodiment of the present invention.

At a fourth step, $dW(n+1)=dW(n)+(T-O)\times X\times\alpha$ is executed. More specifically, the value of the register 106 is sent to the difference value memory 218 through the limiter 220. The limiter 220 performs a processing reverse to that of the bit extender 221. For example, the limiter 220 limits an input 8-bit difference value to a 4-bit difference value as shown in FIG. 8. In FIG. 8, an axis of abscissa indicates an input value of –128 to 127. If the input value ranges from –7 to 6, an output value (an axis of ordinate) is equal to the input value. If the input value ranges from –128 to –8 and from 7 to 127, the output value is limited to –8 and 7.

In FIG. 4, the difference value memory 218 stores the output of the limiter 220 according to the address B sent from the control circuit 216. The address B sent from the control circuit 216 indicates an address of a current weight value to be changed.

By executing the first to fourth steps for all the weight values, the additional learning is performed.

In FIG. 4, all components but the input memory 101, the weight memory 203, the difference value memory 218 and the coefficient register 202 form calculating means 51 for calculating an output value of each neuron of the output layer when recognizing a set of input data sent from the input memory 101. In FIG. 4, all components but the input memory 101, the weight memory 203, the difference value memory 218 and the output memory 107 form weight value changing means 61 for changing all initial weight values stored in the weight memory 203 according to the Delta rule during the additional learning.

Figure 6:
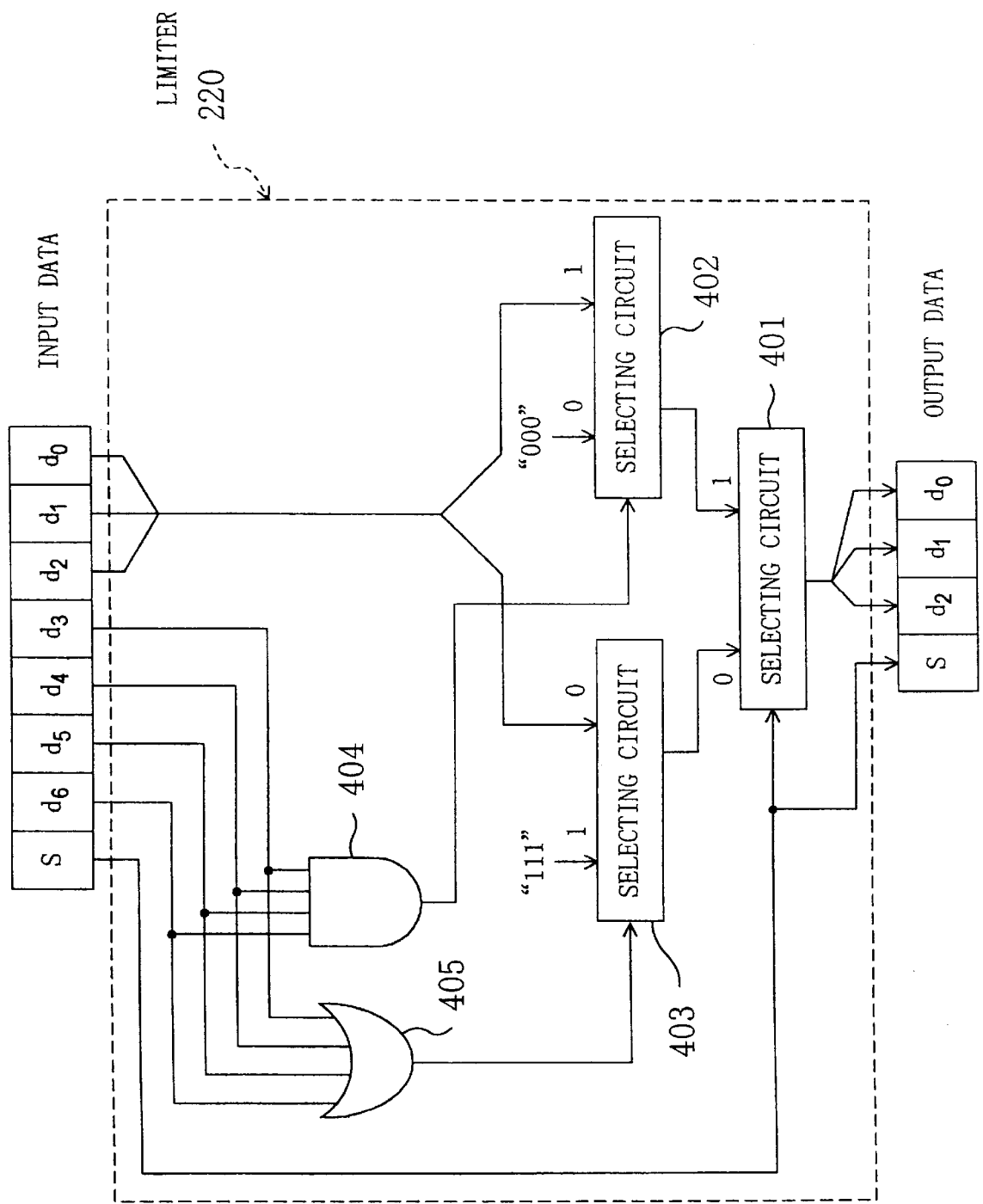
FIG. 6 is a diagram showing a structure of a limiter according to the second embodiment of the present invention.

FIG. 6 shows an internal structure of the limiter 220. In the limiter 220 shown in FIG. 6, if the input data is positive, that is, a most significant bit has a value "0", the selecting circuit 401 selects the selecting circuit 403. If signals of bits d3 to d6 have a value "1" by an output of an OR circuit 405, the selecting circuit 403 selects a value "111". If the signals of the bits d3 to d6 do not have the value "1", the selecting circuit 403 selects input data d2 to d0. If the input data is negative, the selecting circuit 401 selects an output of the selecting circuit 402. If the signals of input data d3 to d6 have the value "0", the selecting circuit 402 selects a value "000" according to an output of an AND circuit 404. If the signals of the input data d3 to d6 do not have the value "0", the selecting circuit 402 selects the input data d2 to d0. Consequently, a difference value having an 8-bit width is limited to have a 4-bit width.

In the present embodiment, the number of addresses of the difference value memory 218 is equal to that of addresses of the weight memory 203. However, a bit width of the difference value is 1/x (x=2 to 5) of that of the weight value. Therefore, the additional learning can be implemented while reducing a capacity of the difference value memory 218 to 1/x (x=2 to 5) of that of the weight memory 203. The learning rule may be a Hebb rule.

Since the difference value memory 218 is small-sized, it can be built in. In addition, after an output of a neural network for the input data is retained by the output memory 107, the difference value can be calculated without using the weight memory 203. Consequently, the additional learning can be performed at a high speed.

Third Embodiment

Figure 9:
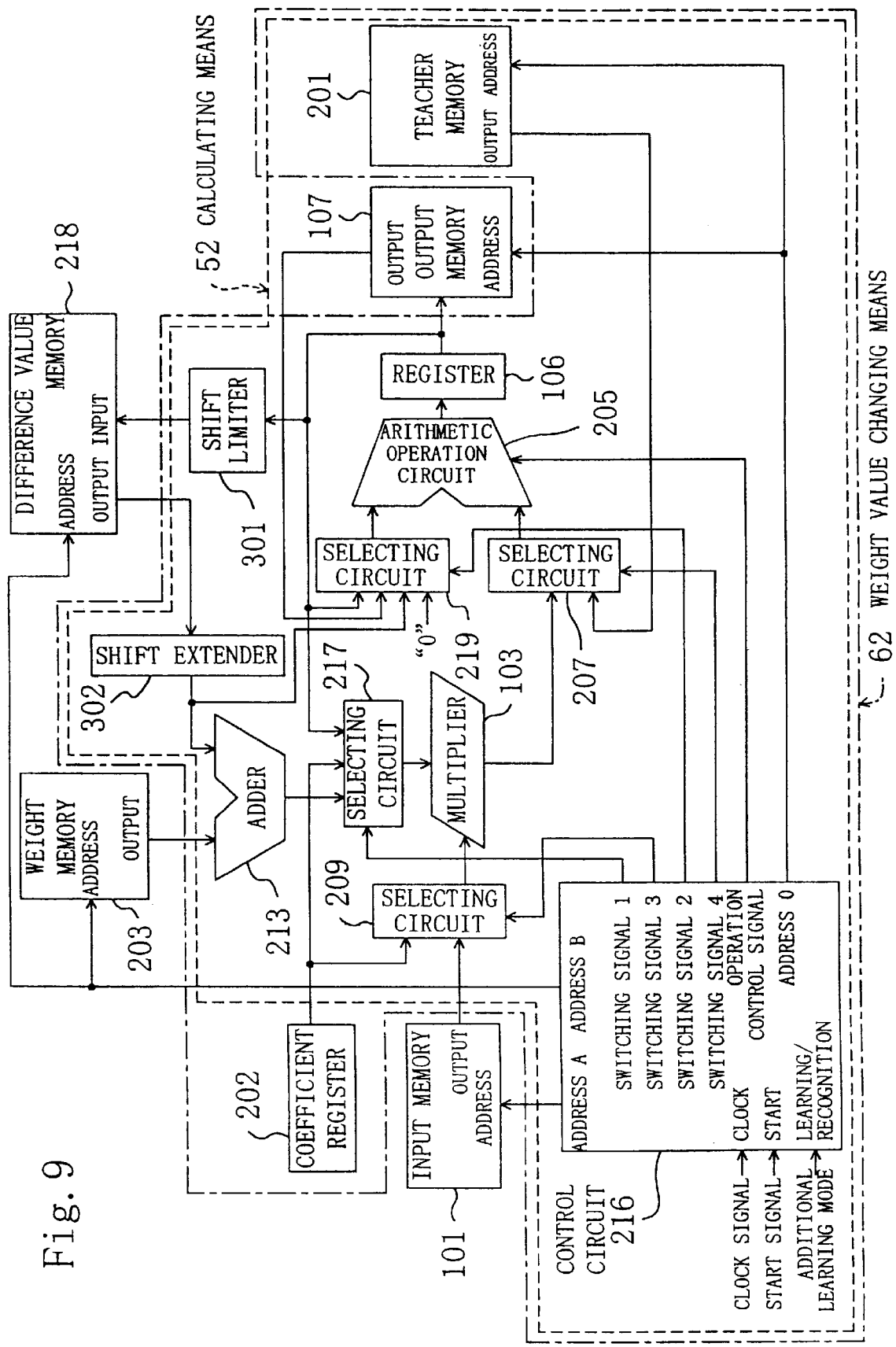
FIG. 9 is a diagram showing a structure of a neural network circuit according to a third embodiment of the present invention.

FIG. 9 shows a neural network circuit according to a third embodiment of the present invention. The neural network circuit shown in FIG. 9 comprises an input memory 101, a coefficient register 202, a weight memory 203, a difference value memory 218, an adder 213, a shift extender 302, a shift limiter 301, a multiplier 103, an arithmetic operation circuit 205, a register 106, an output memory 107, selecting circuits 209, 217, 207 and 219, a control circuit 216 and a teacher memory 201.

The neural network circuit shown in FIG. 9 is different from the neural network circuit shown in FIG. 4 in that the bit extender 221 shown in FIG. 4 is replaced with the shift extender 302 and the limiter 220 shown in FIG. 4 is replaced with the shift limiter 301. Operation of recognizing input data and that of additional learning are not greatly changed. Structures of calculating means 52 and weight value changing means 62 according to the present embodiment are different from those of the calculating means 51 and the weight value changing means 61 according to the second embodiment in the above-mentioned respects. The shift extender 302 and the shift limiter 301 will be described below.

Figure 10:
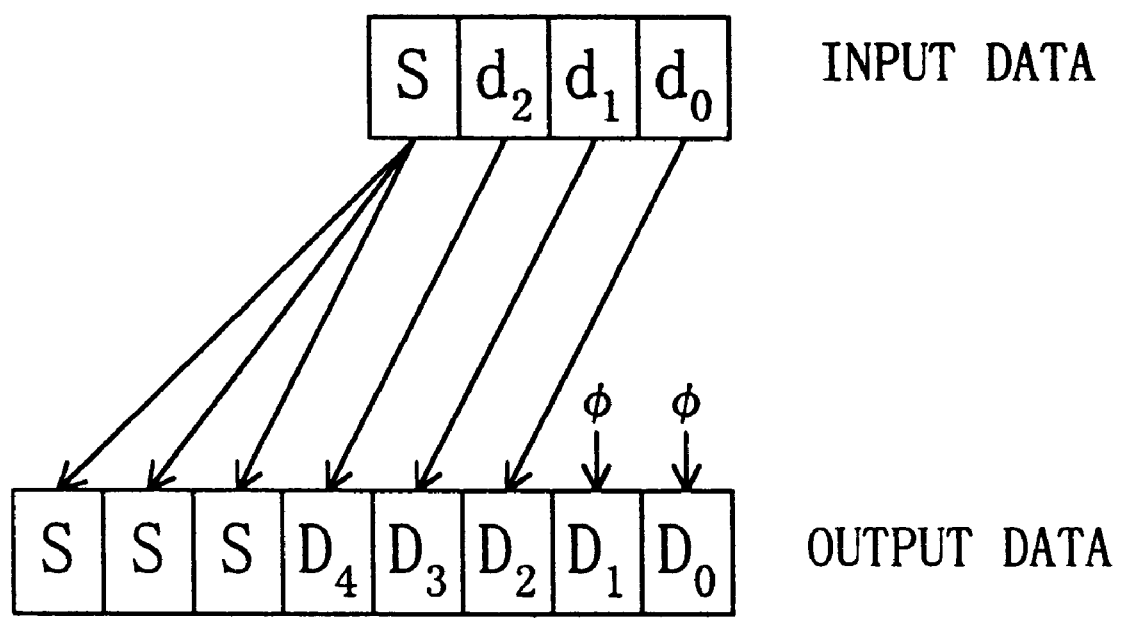
FIG. 10 is a diagram showing operation of a shift extender according to the third embodiment of the present invention.

FIG. 10 shows an input-output relationship of the shift extender 302 in which an input has 4 bits, an output has 8 bits and a shift quantity is "2". A most significant bit of the input of the shift extender 302 is connected to high order 3 bits of the output. d0 to d2 bits of the input are connected to D2 to D4 bits of the output, and a value "0" is connected to D0 and D1 bits of the output. By this structure, an input value is multiplied by 4 (namely, is shifted left by 2 bits), and a result thereof is output.

Figure 11:
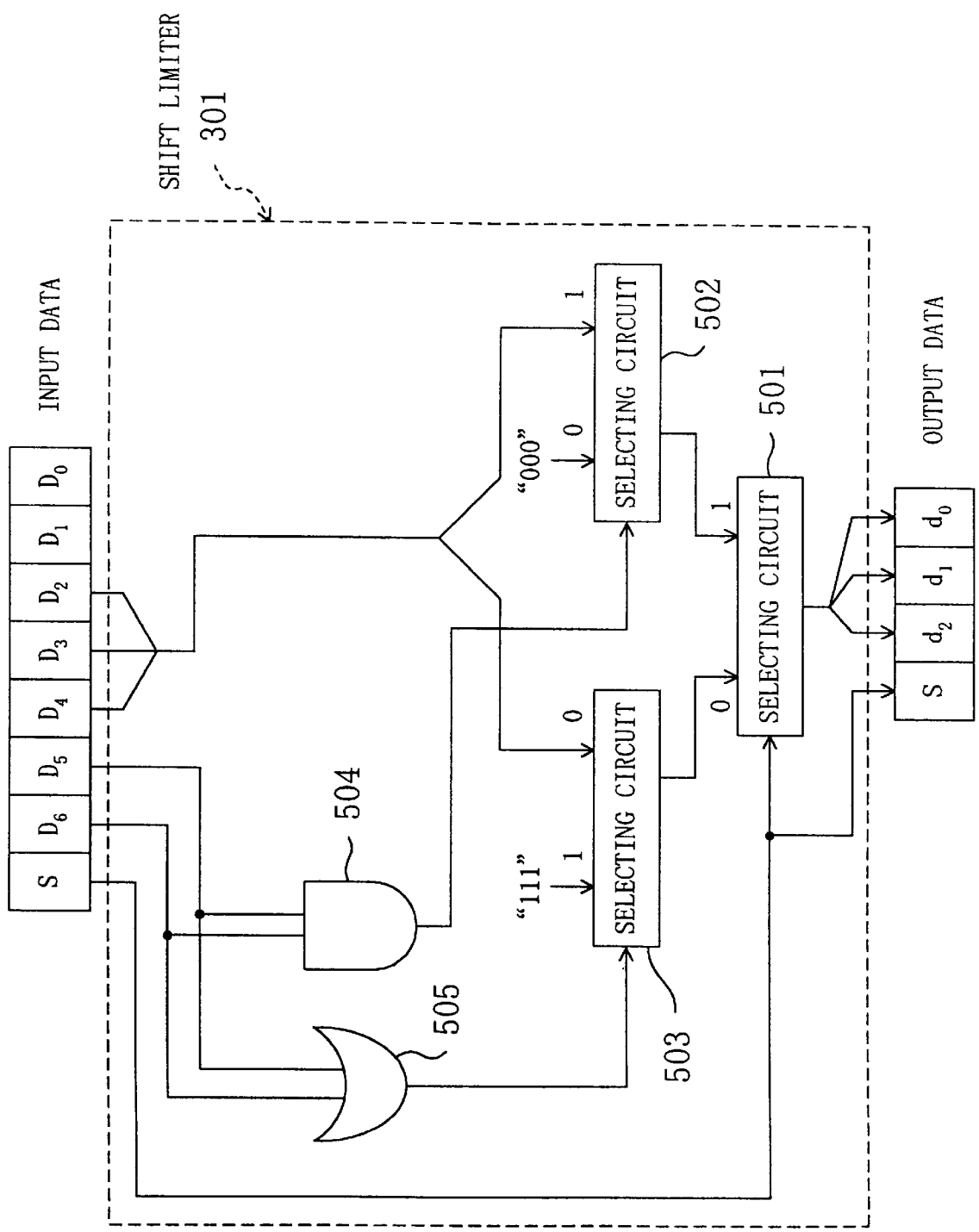
FIG. 11 is a diagram showing a structure of a shift limiter according to the third embodiment of the present invention.
Figure 12:
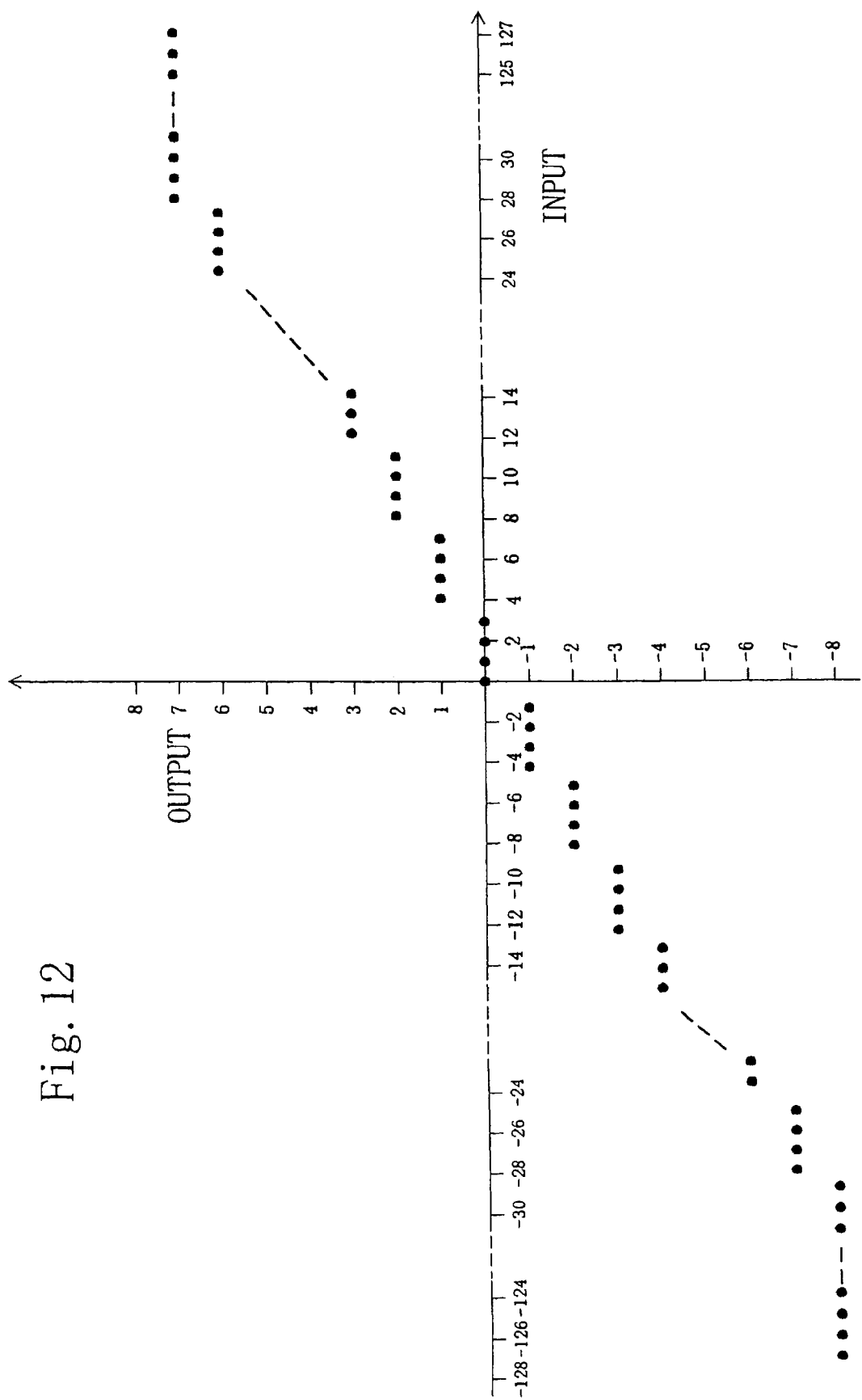
FIG. 12 is a chart for explaining an input-output relationship of the shift limiter according to the third embodiment of the present invention.
Figure 13:
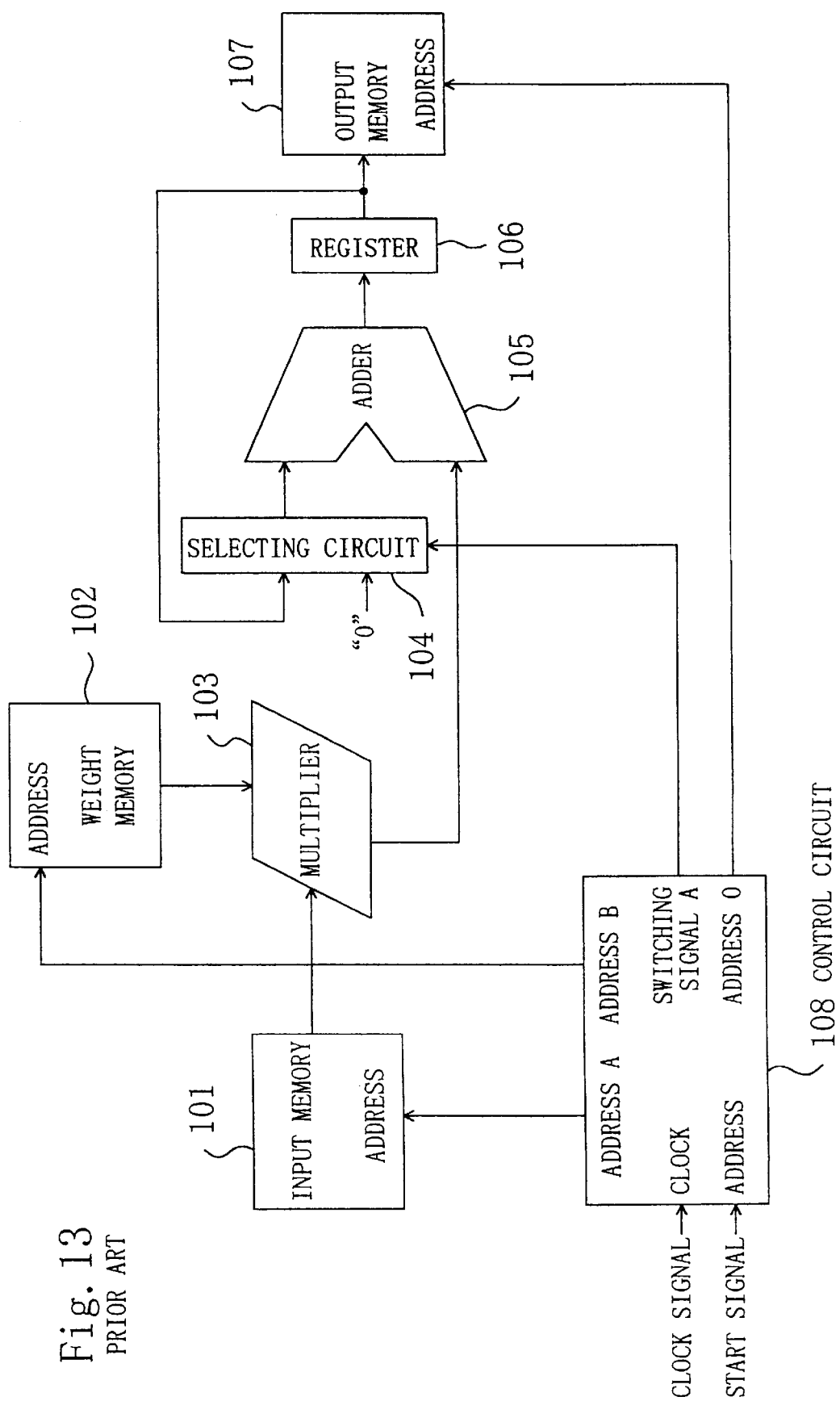
FIG. 13 is a diagram showing a structure of a neural network circuit according to the prior art.
Figure 14:
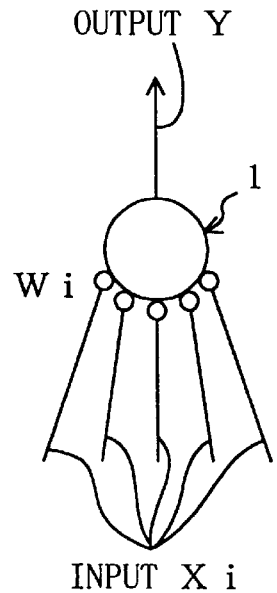
FIG. 14 is a diagram showing a structure of a neuron.

The shift limiter 301 shown in FIG. 11 performs conversion reverse to that of the shift extender 302. More specifically, an input 8-bit difference value is shifted right by 2 bits, and a result of the shift is limited to a 4-bit difference value. The operation of the shift limiter 301 is shown in FIG. 12. In FIG. 12, an axis of abscissa indicates an input value of −128 to 127. If the input value is 0 to 3, an output value (axis of ordinate) is "0". If the input value ranges from 4 to 7, the output value is "1". Every time the input value is increased by "4", the output value is also increased by "1". If the input value ranges from 28 to 127, the output value is limited to "7". Also in the case where the input value is negative, the output value is decreased by "1" every time the input value is decreased by "4". If the input value ranges from −29 to −128, the output value is limited to "−8".

In the shift limiter 301, if the input data is positive, that is, the most significant bit has a value "0", the selecting circuit 501 selects the selecting circuit 503 as shown in a circuit structure of FIG. 11. If a d5 or d6 bit has a value "1", the selecting circuit 503 selects a value "111" in response to an output of an OR circuit 505. If the d5 and d6 bits do not have the value "1", the selecting circuit 503 selects input data d4 to d2. If the input data is negative, the selecting circuit 501 selects the selecting circuit 502. If the d6 or d5 bit has the value "0", the selecting circuit 502 selects a value "000" in response to an output of an AND circuit 504. If the d6 and d5 bits do not have the value "0", the selecting circuit 502 selects the input data d4 to d2. Consequently, a difference value having an 8-bit bit width is shifted left by 2 bits and is limited to 4-bits.

According to the above-mentioned structure, a difference value calculated by the adder 213, that is, maximum and minimum values of dWij (n) in the equation (11) can be increased. Therefore, the difference value can be changed to a greater value without increasing a bit width of the difference value memory 218 as compared with the second embodiment shown in FIG. 4. Thus, it is possible to perform additional learning having a much higher degree of freedom.

In the present embodiment, the shift quantity of the shift limiter 301 is fixed to "2". If the shift quantity is variable, the maximum and minimum difference values dWij (n) can be varied. Consequently, the difference value dWij (n) in the additional learning can be adapted. Thus, the degree of freedom of the additional learning can be enhanced still more.

While the difference value memories 204 and 218 have been formed by a SRAM in the above description, it is apparent that they may be formed by a DRAM or the like.

Further, the neural network in the present invention has one layer as shown in FIG. 15, but may have a multi-layer construction.

According to the neural network circuit of the present invention described above, even if the weight values of the whole neural network (initially learned weight values) are stored in the ROM, difference values between the initial weight values and the additionally learned weight values are stored in the difference value memory such as a RAM having a smaller size than that of the ROM. Therefore, the difference value memory can be built in to perform the additional learning at a high speed. Thus, a neural network circuit capable of performing the additional learning can be implemented.

Although the present invention has fully been described by way of example with reference to the accompanying drawings, it is to be understood that various changes and modifications will be apparent to those skilled in the art. Therefore, unless otherwise such changes and modifications depart from the scope of the invention, they should be construed as being included therein.

We claim:

1. A neural network circuit comprising a plurality of neurons composing at least one layer and each having an output terminal and a plurality of input terminals, in which a set of input data are given to each of the input terminals of the neurons to obtain respective outputs of the neurons and are recognized on the basis of the respective outputs, said neural network circuit comprising:

a weight memory for storing a plurality of initially learned weight values which respectively correspond to the input terminals of the neurons, the weight memory being formed of a read-only memory (ROM);

a difference value memory for storing difference values between the respective initially learned weight values stored in the weight memory and respective additionally learned weight values which respectively correspond to the initially learned weight values stored in the weight memory, the difference value memory being formed of a random-access memory (RAM) from which data can be read and into which data can be written; and calculating means for calculating respective output values of the neurons on the basis of the set of input data given, the initially learned weight values of the weight memory and the difference values of the difference value memory when recognizing the set of input data.

2. The neural network circuit of claim 1, further comprising weight value changing means for changing the initially learned weight values stored in the weight memory according to a predetermined learning rule so as to precisely recognize a new set of input data at the additional learning.

3. A neural network circuit comprising a plurality of neurons composing at least one layer and each having an output terminal and a plurality of input terminals, in which a set of input data are given to each of the input terminals of the neurons to obtain respective outputs of the neurons on the basis of the set of input data and weight values respectively corresponding to the input terminals of the respective neurons and are recognized on the basis of the respective outputs, said neural network circuit comprising:

a weight memory for storing a plurality of initially learned weight values which respectively correspond to the input terminals of the neurons, the weight memory being formed of a read-only memory (ROM);

weight value changing means for changing the initially learned weight values stored in the weight memory according to a predetermined learning rule so as to precisely recognize a new set of input data at additional learning of the initially learned weight values; and a difference value memory for storing difference values between the respective initially learned weight values stored in the weight memory and respective additionally learned weight values which respectively correspond to the initially learned weight values stored in the weight memory by the weight value changing means, the difference value memory being formed of a random-access memory (RAM) from which data can be read and into which data can be written.

4. The neural network circuit of claim 1, 2 or 3, wherein the weight memory is formed by a ROM and the difference value memory is formed by a RAM having a smaller size than that of the weight memory.

5. The neural network circuit of claim 1, 2 or 3, wherein the difference value memory is formed by a RAM, having addresses of which number is smaller than that of the weight memory, for storing only difference values for a part of the initially learned weight values stored in the weight memory.

6. The neural network circuit of claim 2 or 3, wherein the weight value changing means uses a Hebb rule as the learning rule, and calculates an nth total change value dW (n) on the basis of the following equation when changing the initially learned weight value:

$$dW(n)=dW(n-1)+X(n)\cdot\alpha$$

in which the number of changes of the initially learned weight value is represented by n, nth input data is represented by X (n), a change coefficient is represented by $\alpha$, and the total of 1st to (-1)th change values is represented by dW (n-1), and the calculated nth total change value dW (n) is stored as a difference value in the difference value memory.

7. The neural network circuit of claim 6, wherein the weight value changing means calculates the nth total change value dW (n) by using an arithmetic operation circuit capable of operating as a multiplier and an adder.

8. The neural network circuit of claim 1, 2 or 3, wherein the difference value memory is formed by a RAM for storing difference values respectively corresponding to the initially learned weight values of the input terminals of the neurons and each having bits of which number is smaller than that of the respective initially learned weight values stored in the weight memory.

9. The neural network circuit of claim 1, 2 or 3, further comprising a limiter for limiting a maximum difference value with a limit level having a predetermined value, wherein a difference value obtained after limitation of the limiter is stored in the difference value memory.

10. The neural network circuit of claim 9, further comprising a bit extender for extending a bit width of a difference value read from the difference value memory.

11. The neural network circuit of claim 1 or 2, further comprising a shift limiter for shifting right predetermined low order bits of a difference value expressed by a predetermined bit width to limit a bit width of the shifted difference value to a smaller bit width than the predetermined bit width, wherein the difference value limited by the shift limiter is stored in the difference value memory.

12. The neural network circuit of claim 11, further comprising a shift extender for extending the bit width of a difference value read from the difference value memory to increase a change width of the difference value.

13. The neural network circuit of claim 2 or 3, wherein the weight value changing means uses a Delta rule or a back propagation rule as the learning rule, and calculates an nth total change value dW (n) on the basis of the following equation when changing the initially learned weight value:

$$dW(n)=dW(n-1)+(T(n)-O(n))\cdot X(n)\cdot\alpha$$

in which the number of changes of the initially learned weight value is represented by n, nth input data is represented by X (n), an output value of the neuron is represented by O (n), a teacher value of the output of the neuron is represented by T (n), a change coefficient is represented by $\alpha$, and the total of 1st to (n−1)th change values is represented by dW (n−1), and the calculated nth total change value dW (n) is stored as a difference value in the difference value memory.

14. The neural network circuit of claim 13, wherein the weight value changing means calculates the nth total change value dW (n) by using an arithmetic operation circuit capable of operating as a multiplier and an adder.

15. The neural network circuit of claim 1 or 2, wherein the calculating means adds the initially learned weight value of the weight memory corresponding to one of the input data and the difference value of the difference value memory corresponding to the initially learned weight value when recognizing the set of input data given, and repeatedly multiplies a weight value of a result of the addition and the one input data to calculate an output value of each of the neurons.

* * * * *